(12) United States Patent
Lee et al.

(10) Patent No.: US 12,019,161 B1
(45) Date of Patent: Jun. 25, 2024

(54) MAP GENERATING METHOD OF ELECTRONIC APPARATUS

(71) Applicant: AGENCY FOR DEFENSE DEVELOPMENT, Daejeon (KR)

(72) Inventors: Da Sol Lee, Daejeon (KR); Sang Hyun Joo, Daejeon (KR); Hyoung Woo Lim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/512,634

(22) Filed: Nov. 17, 2023

(30) Foreign Application Priority Data

Feb. 2, 2023 (KR) ........................ 10-2023-0014425

(51) Int. Cl.
 *G01C 3/08* (2006.01)
 *G01S 17/894* (2020.01)
 *G01S 17/933* (2020.01)
 *G06T 15/06* (2011.01)

(52) U.S. Cl.
 CPC .......... *G01S 17/894* (2020.01); *G01S 17/933* (2013.01); *G06T 15/06* (2013.01)

(58) Field of Classification Search
 CPC ..... G01S 17/931; G01S 17/894; G01S 7/4817
 See application file for complete search history.

(56) References Cited

U.S. PATENT DOCUMENTS

| 11,625,009 | B2 * | 4/2023 | Buerkle | ................ G01S 15/04 |
| | | | | 702/181 |
| 2008/0046125 | A1 | 2/2008 | Myeong et al. | |
| 2012/0114174 | A1 | 5/2012 | Hyung et al. | |
| 2020/0088882 | A1 | 3/2020 | Shin | |
| 2021/0041887 | A1 | 2/2021 | Whitman et al. | |
| 2022/0392079 | A1 * | 12/2022 | Toyoshi | ............... G08G 5/0039 |

FOREIGN PATENT DOCUMENTS

| EP | 4011764 A1 * | 6/2022 | .......... B64C 39/024 |
| KR | 100791386 B1 | 1/2008 | |
| KR | 20120037270 A | 4/2012 | |
| KR | 101925862 B1 | 12/2018 | |
| KR | 20190070514 A * | 6/2019 | .......... G09B 29/003 |
| KR | 20210051513 A | 5/2021 | |
| KR | 20220083666 A | 6/2022 | |

* cited by examiner

*Primary Examiner* — Mark Hellner
(74) *Attorney, Agent, or Firm* — MILES & STOCKBRIDGE P.C.

(57) ABSTRACT

Provided is an electronic apparatus and an operation method thereof for, based on location information on a vehicle on a first occupancy grid map, identifying a second occupancy grid map having a first location as an origin and identifying an occupancy state of a grid included in the second occupancy grid map, updating the occupancy state of the grid included in the second occupancy grid map based on information acquired from a sensor, identifying an inflation range corresponding to a first grid among grids included in the second occupancy grid map based on appearance information on the vehicle, and identifying an inflated occupancy state of a second grid included in the inflation range based on an occupancy state of the first grid.

9 Claims, 8 Drawing Sheets

FIG. 4

| | Update number | Occupancy state before update | Occupancy state after update |
|---|---|---|---|
| 400 | 0 | Unknown | Free |
| 410 | 1 | Unknown | Occupied |
| 420 | 2 | Free | Free |
| 430 | 3 | Free | Occupied |
| 440 | 4 | Occupied | Free |
| 450 | 5 | Occupied | Occupied |

FIG. 5

| | Update number | Parameter update rule |
|---|---|---|
| 500 | 0 | $x_{new} = \max(x_{cur}, 0)$ |
| 510 | 1 | $x_{new} = \max(x_{cur}, 0) + 1$ |
| 530 | 3 | $x_{new} = \max(x_{cur}, 0) + 1$ |
| 540 | 4 | $x_{new} = \max(x_{cur}-1, 0)$ |

FIG. 6

| Inflated occupancy state | Parameter |
|---|---|
| 610 { Unknown | x = -1 |
| 620 { Free | x = 0 |
| 630 { Inflated | x ≥ 1 |

MAP GENERATING METHOD OF ELECTRONIC APPARATUS

PRIORITY INFORMATION

This application claims the benefit of Korean Patent Application No. 10-2023-0014425, filed on Feb. 2, 2023, in the Korean Intellectual Property Office, the disclosure of which is incorporated herein by reference.

FIELD OF THE INVENTION

The present disclosure generally relates drone technology, and more particularly, to a map generating method of an electronic apparatus.

DESCRIPTION OF THE RELATED ART

As a drone technology becomes popular, various technologies for an element included in a drone system are also rapidly developing. Particularly, in a modern war environment focusing on being unmanned, a drone may scout an enemy territory and strike an important facility and a war resource without a pilot on board. Thus, the drone is used as a representative asymmetric fighting power for attacking an enemy without casualties.

A small-sized drone is greatly light and inexpensive to be a war resource that may be used on the scale of a squad. In consideration of the fact that a drone is destroyable by an enemy in wartime, sending a high-cost and large-sized drone to a battlefield is ineffective in terms of a cost. Accordingly, in order to prevent a large influence on conduct of war, a method of sending a large number of low-cost and small-sized drones instead of large-sized drones continuously emerges. Particularly, by using a small size and agility of the small-sized drone, research on a method of carrying out a reconnaissance mission in which the small-sized drone escapes from an enemy sight or a detection area of an air defense network, hides behind an obstacle around a ground surface in a low altitude, evades a collision with the obstacle, and reaches a destination point is actively conducted.

A technology of carrying out a mission by a drone recognizing a surrounding environment and performing path planning in real time has been applied to a relatively large-sized drone. However, as sizes and weights of various sensors for recognizing an environment around an aircraft (e.g., a depth camera or a time-of-flight (ToF) sensor such as a three-dimensional light detection and ranging (LiDAR) system) have become smaller and more lightweight lately, it is possible to apply a real-time path planning technology to the small drone.

The present disclosure relates to a map generating method that is one of element technologies used for the small drone to recognize a surrounding environment. Particularly, the present disclosure relates to a method of generating, in real-time, a voxel map shown with a voxel by forming a three-dimensional flight environment into a grid for generating a three-dimensional map.

Related voxel map generating methods mainly include a method using a voxel array or a method using a voxel hash table for storing voxel data. The method using the voxel array has an advantage of a fast data access speed because random access to map data is allowed while its map size being limited by being dependent on a size of the array. On the other hand, the method using the voxel hash table has an unlimited map size while having a disadvantage of a slow data access speed due to an attribute of a hash table data structure.

The present disclosure is a voxel map generating method for compensating a disadvantage of the voxel array, which uses the voxel array for storing the voxel data for increasing an access speed and applies a region map origin updating method for solving a problem of a map size to be limited with the voxel array being used.

SUMMARY OF THE INVENTION

An aspect provides a map generating method of a vehicle. Specifically, the aspect provides a method of generating an occupancy grid map of an environment around the vehicle in real time.

However, the goals to be achieved by example embodiments of the present disclosure are not limited to the objectives described above and other objects may be inferred from the following example embodiments.

According to an aspect, there is provided a map generating method of an electronic apparatus, the map generating method including: based on location information on a vehicle on a first occupancy grid map, identifying a second occupancy grid map having a first location as an origin and identifying an occupancy state of a grid included in the second occupancy grid map, updating the occupancy state of the grid included in the second occupancy grid map based on information acquired from a sensor, identifying an inflation range corresponding to a first grid among grids included in the second occupancy grid map based on appearance information on the vehicle, and identifying an inflated occupancy state of a second grid included in the inflation range based on an occupancy state of the first grid.

According to another aspect, there is also provided an electronic apparatus including a memory in which at least one program is stored, and a processor configured to, by executing the at least one program, based on location information on a vehicle on a first occupancy grid map, identify a second occupancy grid map having a first location as an origin and identify an occupancy state of a grid included in the second occupancy grid map, update the occupancy state of the grid included in the second occupancy grid map based on information acquired from a sensor, identify an inflation range corresponding to a first grid among grids included in the second occupancy grid map based on appearance information on the vehicle, and identify an inflated occupancy state of a second grid included in the inflation range based on an occupancy state of the first grid.

According to still another aspect, there is also provided a non-transitory computer-readable recording medium including a computer program for performing the above-described operation method.

Additional aspects of example embodiments will be set forth in part in the description which follows and, in part, will be apparent from the description, or may be learned by practice of the disclosure.

According to example embodiments, it is possible to increase a grid map data access speed while preventing a negative influence on path panning of a vehicle because a grid map may be properly updated based on a location of the vehicle although a size of the grid map is relatively small. Particularly, the grid map data access speed may be further increased by using a voxel array as a grid map data structure.

Also, according to example embodiments, it is possible to remove a size limit on a region map because a range of the region map may be flexibly changed while an origin is updated.

In addition, according to example embodiments, since inflation of a grid may be performed by using a simple algorithm, it is possible to efficiently acquire a configuration space (C-Space) for the path planning of the vehicle.

Furthermore, according to example embodiments, the inflation is performed for a grid with an occupancy state changed compared to a previous occupancy state of the grid, thus the inflation of the grid may be further rapidly performed.

Effects of the present disclosure are not limited to those described above and other effects may be made apparent to those skilled in the art from the following description.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 4 is a diagram illustrating an example embodiment of an occupancy state of a grid in a method according to the present disclosure;

FIG. 5 is a diagram illustrating an example embodiment of an update rule for a parameter in a method according to the present disclosure;

FIG. 6 is a diagram illustrating an example embodiment of an inflated occupancy state in a method according to the present disclosure;

DETAILED DESCRIPTION

Figure 1:
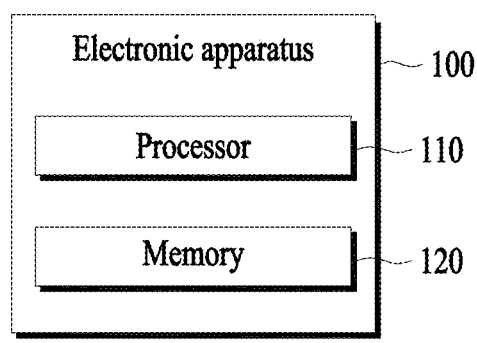
FIG. 1 is a block diagram illustrating an electronic apparatus according to the present disclosure.

Example embodiments described in the present disclosure is to exemplify the present disclosure, not to limit the present disclosure. Those skilled in the art may configure a large number of alternative example embodiments without deviating from a category of the present disclosure which is defined by attached claims. Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it is noted that the terms used herein should be construed based on practical meanings thereof and the content of this specification, rather than being simply construed based on names of the terms.

Terms in a singular form used in the present specification includes all of the terms in the singular form and the plural form unless an apparently and contextually conflicting description is present.

In the entire specification, when a part is referred to as "including" elements or operations, unless a particularly conflicting description is present, it may not be understood that the part includes all the elements or operations. It may be understood that including elements or operations other than those described in the entire claims or the specification is not excluded. It may be merely understood that the other elements or operations may be further included.

Terms including an ordinal number such as "first" or "second" used in the present specification may be used to describe various elements. However, the elements may not be limited by the terms including the ordinal number. The terms are used to contextually distinguish one element from another element in a part of the specification. For example, a first element may be referred to as a second element in another part of the specification, and reversely, the second element may be referred to as the first element in another part of the specification while not deviating from the scope of the present disclosure.

Terms such as "mechanism", "element", "method", or "configuration" may be broadly used and may not be limited to mechanical and physical configurations. The above terms may include the meaning of a series of routines of software in connection with a processor.

Use of the term "the" and other similar terms may be applied to nouns in the singular form and the plural form. In addition, when a range is described, a description includes an individual value included in the range unless a conflicting description is present, which is identical to each individual value included in the range being described in the detailed description. Lastly, when an order of operations included in a method is not apparently described, or when a conflicting description is not present, the operations may be rearranged and performed in a proper order and may not be limited to an order of descriptions of the operations. Use of all examples or exemplary terms (e.g., "for example" or the like) is simply to describe the technical spirit in detail. Accordingly, the scope of the present disclosure is not limited by the examples or the exemplary terms unless limited by the claims. Those skilled in the art may configure a new example embodiment belonging to the claims or a category of equivalents thereof by adding various modifications, combinations, or changes to disclosed example embodiments described in the present specification according to a condition and a factor for a configuration.

In the present disclosure, an occupancy grid map may be a two-dimensional or three-dimensional map showing information on an environment around a vehicle or a drone as an occupancy state of one or more grids. For example, when an area or a volume corresponding to a grid at a predetermined location on a map is filled with an object, the grid may be set to be in an occupied state. In other words, when the vehicle or the drone moves to the location corresponding to the grid in the occupied state, the vehicle or the drone may collide with the object in the location. As another example, when the area or the volume corresponding to the grid at the predetermined location on the map is vacant, the grid may be set to be in a free state. In other words, the vehicle or the drone may freely move to the location corresponding to the grid in the free state. As yet another example, when the area or the volume corresponding to the grid at the predetermined location on the map is not identified as being vacant, the grid may be set to be in an unknown state. Since an occupancy state of the grid in the unknown state is not identified by a sensor or the like, the grid may be set to be in the occupied state or the free state after the grid is surveyed with the sensor or the like. When the occupancy grid map is the three-dimensional map, a grid may be shown in a cube form, and a three-dimensional grid in the cube form may be a voxel.

In the present disclosure, the vehicle may be a moving object. The vehicle may include a manned moving object as well as an unmanned moving object. For example, the vehicle may include an unmanned car, a drone, or the like.

Hereinafter, example embodiments of the present disclosure will be described with reference to the drawings.

FIG. 1 is an exemplary and simplified block diagram illustrating an electronic apparatus 100 usable to execute at least one example embodiment of the present disclosure. In various example embodiments, the electronic apparatus may be used to implement any system or method described in the present disclosure. For example, the electronic apparatus 100 may be configured to be used as an electronic apparatus including a data server, a web server, a mobile computing device, a personal computer, a tablet computer, a workstation, a mobile phone, a smart phone, or any other devices described below.

The electronic apparatus 100 may include a memory 120, one or more cache memories configurable to communicate with the memory 120, and one or more processors 110 having a memory controller. Additionally, an electronic apparatus 100 may include another device connectable to the electronic apparatus 100 through one or more ports (e.g., a universal serial bus (USB), a headphone jack, a Lightning connector, a Thunderbolt connector, or the like). The device connectable to the electronic apparatus 100 may include a plurality of ports configured to receive an optical fiber connector. A configuration of the electronic apparatus 100 which is illustrated is intended to be a predetermined example for a purpose of exemplifying a proper example embodiment of the device. Only elements associated with the present example embodiments are illustrated in the illustrated electronic apparatus 100. Thus, it is apparent to those skilled in the art that other general elements may be further included in addition to the illustrated elements.

A processor 110 may be used for the electronic apparatus 100 to provide an operation or a function of any example embodiment described in the present disclosure. For example, the processor 110 may control the electronic apparatus 100 overall by executing programs stored in the memory 120 in the electronic apparatus 100. The processor 110 may be implemented as a central processing unit (CPU), a graphics processing unit (GPU), an application processor (AP), or the like. However, it is merely an example.

The memory 120 is hardware in which a variety of data processed in the electronic apparatus 100 is stored. The memory 120 may store data that has been processed and data to be processed through the processor 110 in the electronic apparatus 100. In addition, the memory 120 may store a basic programming and data structure for providing a function of at least one example embodiment of the present disclosure as well as applications (e.g., a program, a code module, or an instruction), drivers, or the like for providing functions of example embodiments of the present disclosure. The memory 120 may include a random-access memory (RAM) such as a dynamic random access memory (DRAM) and a static random access memory (SRAM), a read-only memory (ROM), an electrically erasable programmable read-only memory (EEPROM), a compact disc (CD)-ROM, an optical disc storage including Blu-ray, a hard disk drive (HDD), a solid state drive (SSD), or a flash memory.

Although a method and each operation according to the present disclosure may be performed by the electronic apparatus 100 or the processor 110, hereinafter, descriptions are under a premise that the processor 110 is an entity performing the method and each operation according to the present disclosure in order to simplify the descriptions.

Figure 2:
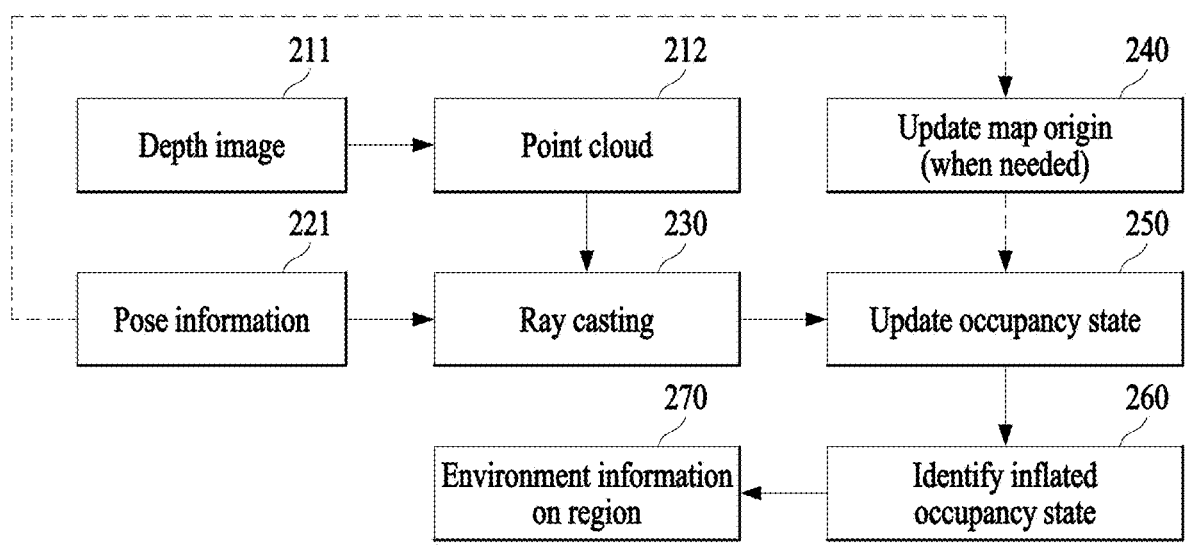
FIG. 2 is a block diagram illustrating a method according to the present disclosure.

FIG. 2 is a block diagram illustrating a method according to the present disclosure. In an example embodiment, based on location information on a vehicle on a first occupancy grid map, the processor 110 may identify a second occupancy grid map having a first location as an origin and identify an occupancy state of a grid included in the second occupancy grid map. Specifically, the processor 110 may update an origin of the first occupancy grid map to be at the first location based on pose information 221 on the vehicle as illustrated by reference numeral 240, identify the second occupancy grid map, and initialize the occupancy state of the grid included in the second occupancy grid map. The above-described process will be further described in detail with reference to FIG. 3.

The pose information 221 may be location and position information on the vehicle. For example, the pose information 221 may be acquired through an inertial measurement system such as an accelerometer, a gyro sensor, and an inertial measurement unit or a location measurement system such as a global positioning system (GPS).

In an example embodiment, the processor 110 may update the occupancy state of the grid included in the second occupancy grid map based on information acquired from a sensor. Specifically, the processor 110 may perform ray casting based on depth image 211 acquired from a time-of-flight (ToF) sensor and the pose information 221 acquired from an inertial sensor as illustrated by reference numeral 230. Through this, the processor 110 may update an occupancy state of a grid included in an occupancy grid map as illustrated by reference numeral 250. For example, the processor 110 may acquire a depth image 211 from a depth camera included in the vehicle, identify information on a point cloud 212 from the depth image 211, and perform the ray casting based on the information on the point cloud 212 and the pose information 221 as illustrated by the reference numeral 230. Through this, the processor 110 may update the occupancy state of the grid included in the occupancy grid map as illustrated by the reference numeral 250. As such, since the occupancy state is updated based on the information acquired from the sensor as illustrated by the reference numeral 250, the updated occupancy state of the grid may not be in an unknown state. In other words, in an example embodiment, the processor 110 may update the occupancy state of the grid included in the second occupancy grid map to be one of an occupied state and a free state.

The point cloud 212 is illustrated to be identified from the depth image 211 in FIG. 2. However, it is merely an example, and the point cloud 212 may be identified from a known ToF sensor. For example, the point cloud 212 may be acquired from a light detection and ranging (LiDAR) sensor.

The processor 110 may perform the ray casting based on the pose information 221 on the vehicle or based on the position information on the vehicle and the information on the point cloud 212. Through this, the processor 110 may identify the occupancy state of the grid included in the occupancy grid map. For example, the processor 110 may use a pointing direction information on a ToF sensor included in the vehicle and pose information on the vehicle to identify a direction toward which the ToF sensor points in a grid map. The processor 110 may use the direction toward which the ToF sensor points, an angle of view of the ToF sensor, and data of the point cloud 212 to update occupancy states of grids around the direction toward which the ToF sensor points. At this point, an occupancy state of each of the grids may be updated based on a probability of each of the grids being occupied. For example, when a probability of a grid being occupied is identified as being greater than or equal to a predetermined value, an occupancy state of the grid may be updated to be the occupied state. When the probability of the grid being occupied is identified as less than the predetermined value, the occupancy state of the grid may be updated to be the free state. At this point, the predetermined value may be zero point five (0.5), zero point seven five (0.75), or the like. The probability of each of the grids being occupied may be estimated by using a filter known to the field or an estimation algorithm based on a measurement model reflecting a measurement attribute of an inertial sensor included in the vehicle, the ToF sensor, or the like and a dynamics model of the vehicle.

Path planning may be performed to avoid an obstacle and moving the vehicle to a destination point. When an algorithm for the path planning is applied, the vehicle may be regarded as a material point. In order to regard the vehicle as the material point, based on appearance information on the vehicle, grids around grids in the occupied state in the occupancy grid map are required to be regarded as being in the occupied state. Thus, in an example embodiment, the processor 110 may identify an inflation range corresponding to a first grid among grids included in the second occupancy grid map based on the appearance information on the vehicle and identify an inflated occupancy state of a second grid included in the inflation range based on an occupancy state of the first grid. Specifically, based on an occupancy state of each of grids included in a grid map, the processor 110 may identify an inflated occupancy state of each of the grids as illustrated by reference numeral 260 and update environment information 270 on a region around the vehicle. The environment information 270 may include information on an obstacle around the vehicle.

Specifically, based on a length of the vehicle, the processor 110 may identify an inflation range having the first grid as a center. The length of the vehicle may be identified from an appearance of the vehicle. For example, the length of the vehicle may be a distance from a center of mass of the vehicle to a farthest surface of the vehicle. At this point, the inflation range may be a circle or a sphere having the first grid as a center and the distance as a radius thereof. In contrast, the inflation range may be a square or a cube having the first grid as a center and the distance as a half of a side thereof for convenience of calculation.

In an example embodiment, sizes and a number of grids included in the occupancy grid map may be determined in consideration of the appearance information on the vehicle, the information on the obstacle around the vehicle, a sphere of activity of the vehicle, the inertial sensor included in the vehicle, accuracy or resolution of a navigational sensor or the ToF sensor, a storage space for map data, a calculation speed of the processor 110, or the like. For example, the occupancy grid map may be a two-dimensional or three-dimensional grid map including a grid in the form of a square or a cube having a fifteen-centimeter-long side. The grids included in the occupancy grid map may be equal to each other in size, but the size of a grid may be dynamically determined depending on the situation. For example, a region determined to have fewer obstacles than a surrounding region may include a grid with a larger size when compared to the surrounding region, which is an advantage of saving a resource for calculating the grid map and a storage space of grid map data.

The present disclosure includes, in a form of a local map including occupancy information, a two-dimensional or three-dimensional occupancy grid map including a grid in a form of a square or a cube. However, it is merely an example, the form of the local map may include all known forms dividing a two-dimensional or three-dimensional map into detailed regions. For example, the local map may be divided into circles or regular hexagons equal in size or into spheres or regular polyhedrons equal in size.

Figure 3:
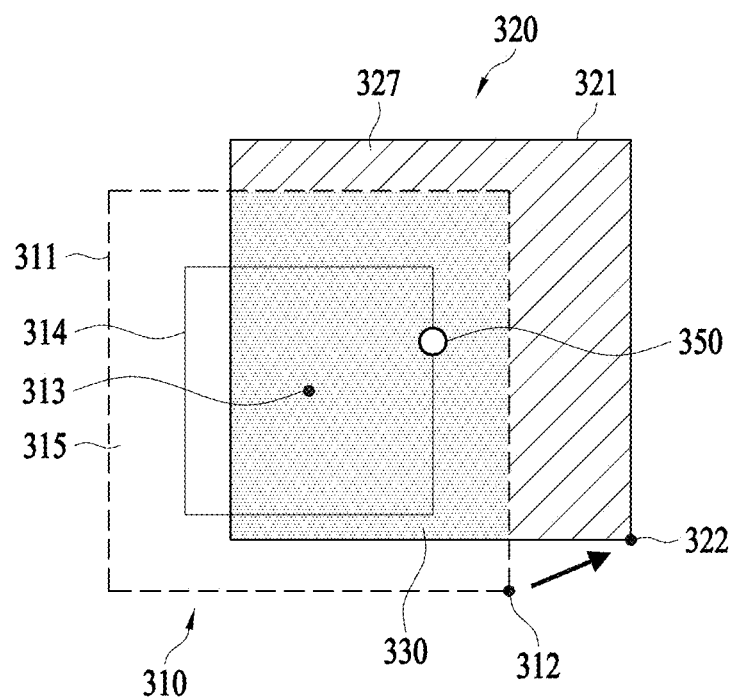
FIG. 3 is a diagram illustrating an example embodiment of updating a map origin in a method according to the present disclosure.

FIG. 3 is a diagram illustrating an example embodiment of updating a map origin in a method according to the present disclosure. In an example embodiment, the processor 110 may update a first occupancy grid map 310 to be a second occupancy grid map 320 based on pose information on a vehicle. In other words, the processor 110 may identify an area included in the second occupancy grid map 320 as an area for an exploration instead of an area included in the first occupancy grid map 310. At this point, the processor 110 may identify a first area 315 based on at least one of a boundary 311 of the first occupancy grid map 310 and a first boundary 314. Specifically, the processor 110 may identify the first area 315 which is surrounded by the boundary 311 of the first occupancy grid map 310 and the first boundary 314. In other words, the first area 315 may include an area around the boundary 311 of the first occupancy grid map 310. In an example embodiment, when a location 350 of the vehicle is included in the first area 315, the processor 110 may update the first occupancy grid map 310 to be the second occupancy grid map 320, which is an advantage of saving a calculation resource of the processor 110 by preventing an excessively frequent update on an occupancy grid map. The first boundary 314 may include a figure spaced inward from the boundary 311 of the first occupancy grid map 310 by a predetermined distance.

In an example embodiment, the processor 110 may identify the second occupancy grid map 320 by updating an origin 312 of the first occupancy grid map to be at a first location 322 based on the pose information on the vehicle. Specifically, the processor 110 may identify the first location 322 based on displacement of the vehicle from a center 313 of the first occupancy grid map 310. For example, the processor 110 may identify displacement from the center 313 of the first occupancy grid map 310 to the location 350 of the vehicle and identify, the first location 322 as a center of the second occupancy grid map 320, wherein the first location 322 is spaced by the displacement from the center 313 of the first occupancy grid map 310.

In an example embodiment, the processor 110 may initialize an occupancy state of a grid included in the second occupancy grid map 320. Specifically, the processor 110 may identify an overlap area 330 between the second occupancy grid map 320 and the first occupancy grid map 310 based on the displacement of the vehicle with the center 313 of the first occupancy grid map 310 as the reference and initialize the occupancy state of the grid included in the second occupancy grid map 320 based on an occupancy state of a grid included in the first occupancy grid map 310. For example, the processor 110 may identify, among grids included in the second occupancy grid map 320, an occupancy state of a grid included in the overlap area 330 between the second occupancy grid map 320 and the first occupancy grid map 310 as being identical to an occupancy state of a grid of the first occupancy grid map 310 included in the overlap area 330. In other words, the processor 110 may identify, among the grids included in the second occupancy grid map 320, a grid corresponding to a grid included in the first occupancy grid map 310 and identify an occupancy state of the corresponding grid as an occupancy state of the grid included in the first occupancy grid map 310. Since the processor 110 may identify, from data on the first occupancy grid map 310, an occupancy state of a grid corresponding to the overlap area 330 between the second occupancy grid map 320 and the first occupancy grid map 310, there is an advantage of efficiently initializing the second occupancy grid map 320.

In an example embodiment, the processor 110 may initialize an occupancy state of a grid included in a remaining area 327 excluding the overlap area 330 from the second occupancy grid map 320 (e.g., an area surrounded, of an area outside the overlap area 330 in the second occupancy grid map 320, by the first boundary 311 of the first occupancy grid map 310 and a boundary 321 of the second occupancy grid map 320) to be an unknown state. In other words, the processor 110 may identify the occupancy state of the grid included in the second occupancy grid map 320 as one of an occupied state, a free state, and the unknown state.

In an example embodiment, the processor 110 may identify an inflated occupancy state of a second grid as one of an occupied state, a free state, and an unknown state based on a result of an update on an occupancy state of a first grid among grids included in a second occupancy grid map. FIG. 4 is a diagram illustrating a result of an update on an occupancy state of a grid included in the second occupancy grid map. At this point, the update on the occupancy state of the grid may be the updating of the occupancy state as illustrated by the reference numeral 250 in FIG. 2.

In a table of FIG. 4, a first line may show a number for each update when the occupancy state is updated. For example, the occupancy state of the grid may not be changed after the update on the occupancy state. In other words, an occupancy state before and an occupancy state after the update on the grid may be identical to each other as the free state as illustrated in reference numeral 420 or as the occupied state as illustrated in reference numeral 450. As another example, the occupancy state may be changed from the unknown state to the free state as illustrated by reference numeral 400. The occupancy state may be changed from the unknown state to the occupied state as illustrated by reference numeral 410. The occupancy state may be changed from the free state to the occupied state as illustrated by reference numeral 430. The occupancy state may be changed from the occupied state to the free state as illustrated by reference numeral 440.

In an example embodiment, the processor 110 may update a parameter corresponding to the second grid based on the result of the update on the occupancy state of the first grid among the grids included in the second occupancy grid map and identify the inflated occupancy state of the second grid based on the updated parameter. The second grid may be a grid around the first grid. For example, the second grid may be a grid included in an inflation range corresponding to the first grid.

FIG. 5 is a diagram illustrating an example embodiment of an update rule for a parameter in a method according to the present disclosure. In a table of FIG. 5, $x_{new}$ and $x_{cur}$ may be a parameter after an update and a parameter before the update, respectively. A first line in the table of FIG. 5 may correspond to the first line in the table of FIG. 4. For example, when an occupancy state of a first grid among grids included in a second occupancy grid map is updated so as to correspond to an update number 0 in FIG. 4 as illustrated by the reference numeral 400, a parameter update rule 500 corresponding to an update number 0 in FIG. 5 may be applied to a second grid. In an example embodiment, as illustrated by reference numeral 510 and 530, the processor 110 may increase a parameter corresponding to the second grid when the occupancy state of the first grid is changed into an occupied state as a result of the update as illustrated by the reference numeral 410 and 430. As illustrated by reference numeral 540, the processor 110 may decrease the parameter when the occupancy state of the first grid is changed from the occupied state to a free state as the result of the update as illustrated by the reference numeral 440. An increase and a decrease in the parameter which is illustrated in FIG. 5 are one each, but the increase and the decrease in the parameter may be set to another different value.

FIG. 6 is a diagram illustrating an example embodiment of an inflated occupancy state in a method according to the present disclosure. A parameter illustrated in FIG. 6 may correspond to the parameter illustrated in FIG. 5. In an example embodiment, the parameter may be a negative number, zero, or a positive number. When the parameter is the negative number, the processor 110 may determine an inflated occupancy state of a second grid to be an unknown state. For example, as illustrated by reference numeral 610, the processor 110 may determine the inflated occupancy state of the second grid to be the unknown state when the parameter is negative one. Also, in an example embodiment, the processor 110 may determine the inflated occupancy state of the second grid to be a free state when the parameter is less than or equal to a predetermined second value. For example, as illustrated by reference numeral 620, the processor 110 may determine the inflated occupancy state of the second grid to be the free state when the parameter is zero. In addition, in an example embodiment, the processor 110 may determine the inflated occupancy state of the second grid to be an occupied state when the parameter is greater than or equal to a predetermined first value. For example, as illustrated by reference numeral 630, the processor 110 may determine the inflated occupancy state of the second grid to be the occupied state when the parameter is greater than or equal to positive one. Accordingly, there is an advantage of identifying three inflated occupancy states based on one parameter.

In an example embodiment, the parameter may be initialized to be negative one which indicates the unknown state. Alternatively, a value of the parameter may be determined so as to have a value greater than or equal to zero after the parameter is updated at least once. In other words, with a "max" function or the like illustrated in the table of FIG. 5, the parameter may be updated based on a greater value between a parameter value and zero. Accordingly, there is an advantage of preventing the inflated occupancy state of the second grid from returning to the unknown state by a parameter at least once updated being re-updated by a parameter update rule.

In an example embodiment, at least one of an occupancy state of each grid included in a first occupancy grid map, an occupancy state of each grid included in a second occupancy grid map, and an inflated occupancy state of each grid may be stored as a data structure in an array form in a database. The database may include the memory 120 or an external database of the electronic apparatus 100. Data on an occupancy state of a grid map may be stored in the array form instead of a hash table, which is an advantage of increasing an access speed for the occupancy state of the grid map.

Figure 7:
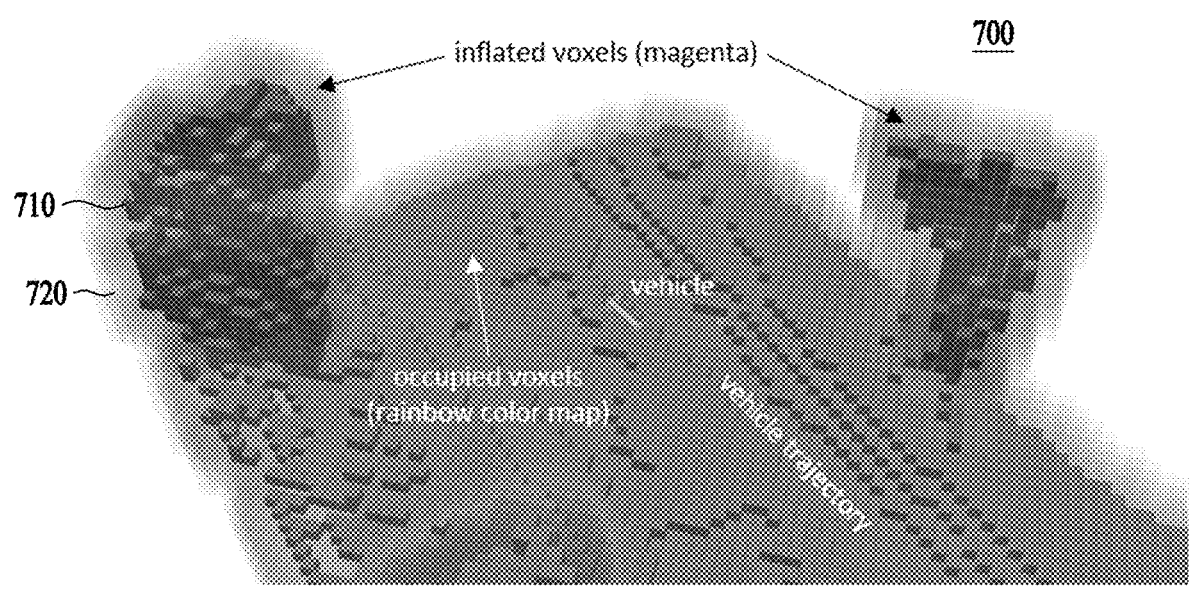
FIG. 7 is a diagram visualizing a performance result of a method according to the present disclosure.

FIG. 7 is a diagram illustrating a three-dimensional voxel map 700 visualizing a performance result of a method according to the present disclosure. By using the method according to the present disclosure, the processor 110 may identify a first voxel 710 in an occupancy state among voxels included in the three-dimensional voxel map 700 and identify an inflated occupancy state of a second voxel 720 based on the occupancy state of the first voxel 710. By using a method known to the field and based on the voxel map 700, the processor 110 may plan a path of a vehicle and control a movement of the vehicle.

Figure 8:
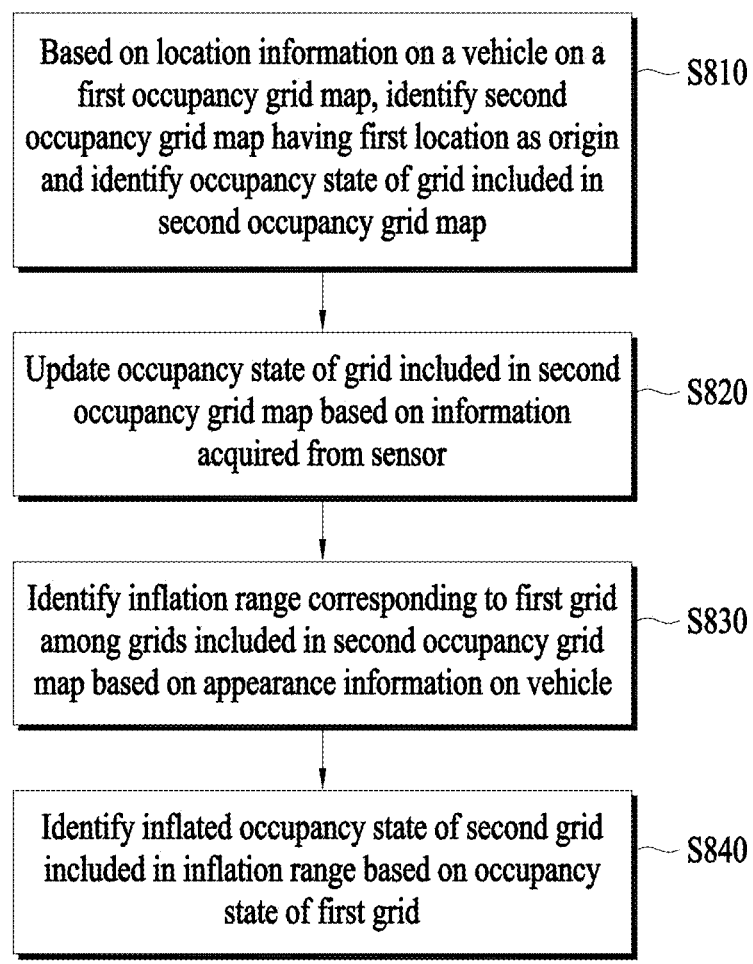
FIG. 8 is a diagram illustrating an example embodiment of a method according to the present disclosure.

FIG. 8 is a diagram illustrating an operation method of the electronic apparatus 100 according to an example embodiment. With respect to each operation in the operation method of FIG. 8, redundant descriptions similar to the operation of the electronic apparatus 100 or the processor 110 described in FIGS. 1 through 7 will be omitted.

In operation S810, based on location information on a vehicle on a first occupancy grid map, the electronic apparatus 100 may identify a second occupancy grid map having a first location as an origin and identify an occupancy state of a grid included in the second occupancy grid map.

In addition, the electronic apparatus 100 may identify the first location based on displacement of the vehicle from a center of the first occupancy grid map.

Also, the electronic apparatus 100 may identify a grid corresponding to a grid included in the first occupancy grid map among grids included in the second occupancy grid map and identify an occupancy state the corresponding grid as an occupancy state of the grid included in the first occupancy grid map.

Furthermore, the electronic apparatus 100 may identify the occupancy state of the grid included in the second occupancy grid map as one of an occupied state, a free state, and an unknown state.

In operation S820, the electronic apparatus 100 may update the occupancy state of the grid included in the second occupancy grid map based on information acquired from a sensor.

Also, the electronic apparatus 100 may update the occupancy state of the grid included in the second occupancy grid map to be one of the occupied state and the free state.

Additionally, the electronic apparatus 100 may perform ray casting based on depth information acquired from a ToF sensor and pose information acquired from an inertial sensor.

In operation S830, the electronic apparatus 100 may identify an inflation range corresponding to a first grid among the grids included in the second occupancy grid map based on appearance information on the vehicle.

In addition, the electronic apparatus 100 may identify, based on a length of the vehicle, an inflation range having the first grid as a center.

In operation S840, the electronic apparatus 100 may identify an inflated occupancy state of a second grid included in the inflation range based on an occupancy state of the first grid.

Furthermore, the electronic apparatus 100 may identify the inflated occupancy state of the second grid as one of the occupied state, the free state, and the unknown state based on a result of an update on the occupancy state of the first grid.

Additionally, the electronic apparatus 100 may increase a parameter corresponding to the second grid when the occupancy state of the first grid is changed into the occupied state as the result of the update, and decrease the parameter when the occupancy state of the first grid is changed from the occupied state to the free state as the result of the update. The electronic apparatus 100 may also determine the inflated occupancy state of the second grid to be the occupied state when the parameter is greater than or equal to a predetermined first value, and determine the inflated occupancy state of the second grid to be the free state when the parameter is less than or equal to a predetermined second value.

In addition, at least one of an occupancy state of each grid included in the first occupancy grid map, an occupancy state of each grid included in the second occupancy grid map, and an inflated occupancy state of each grid may be stored as a data structure in an array form in a database.

The above-described example embodiments according to the present disclosure may be implemented in a form of a program instruction executable through various computer elements and may be recorded in a computer-readable recording medium or a non-transitory recording medium. The computer-readable recording medium or the non-transitory recording medium may include a program instruction, a data file, a data structure, or the like individually or in combination with each other. The program instruction recorded in the computer-readable recording medium or the non-transitory recording medium may be specially designed and configured for the present disclosure or may be publicly disclosed to and usable by those skilled in the art in a field of computer software. An example of the computer-readable recording medium or the non-transitory recording medium includes a magnetic medium such as a hard disk, a floppy disk, and a magnetic tape, an optical recording medium such as a CD-ROM and a digital versatile disk (DVD), a magneto-optical media such as a floptical disk, or a hardware device specially configured to store and execute the program instruction such as a ROM, a RAM, and a flash memory. An example of the program instruction includes not only machine language code generated by a compiler but also high-level language code that may be executed by a computer by using an interpreter or the like. The above-described hardware device or electronic apparatus may be configured to operate as one or more software modules for performing processing according to the present disclosure, and vice versa.

The present embodiments may be represented by functional blocks and various processing steps. These functional blocks may be implemented by various numbers of hardware and/or software configurations that execute specific functions. For example, the present embodiments may adopt integrated circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example.

What is claimed is:
1. A map generating method of an electronic apparatus, the map generating method comprising:
based on location information on a vehicle on a first occupancy grid map, identifying a second occupancy grid map having a first location as an origin and identifying an occupancy state of a grid included in the second occupancy grid map;

updating the occupancy state of the grid included in the second occupancy grid map based on information acquired from a sensor;

identifying an inflation range corresponding to a first grid among grids included in the second occupancy grid map based on appearance information on the vehicle; and identifying an inflated occupancy state of a second grid included in the inflation range based on an occupancy state of the first grid, wherein the identifying the second occupancy grid map and identifying of the occupancy state of the grid comprises identifying the occupancy state of the grid included in the second occupancy grid map as one of an occupied state, a free state, and an unknown state, the updating of the occupancy state of the grid comprises updating the occupancy state of the grid included in the second occupancy grid map to be one of the occupied state and the free state, and the identifying of the inflated occupancy state comprises identifying the inflated occupancy state of the second grid as one of the occupied state, the free state, and the unknown state based on a result of an update on the occupancy state of the first grid.

2. The map generating method of claim 1, wherein the identifying the second occupancy grid map and identifying the occupancy state of the grid comprises: identifying the first location based on displacement of the vehicle from a center of the first occupancy grid map.

3. The map generating method of claim 1, wherein the identifying the second occupancy grid map and identifying of the occupancy state of the grid comprises:

identifying a grid corresponding to a grid included in the first occupancy grid map among the grids included in the second occupancy grid map; and identifying an occupancy state of the corresponding grid as an occupancy state of the grid included in the first occupancy grid map.

4. The map generating method of claim 1, wherein the identifying of the inflated occupancy state comprises:

increasing a parameter corresponding to the second grid when the occupancy state of the first grid is changed into the occupied state as the result of the update, and decreasing the parameter when the occupancy state of the first grid is changed from the occupied state to the free state as the result of the update; and determining the inflated occupancy state of the second grid to be the occupied state when the parameter is greater than or equal to a predetermined first value, and determining the inflated occupancy state of the second grid to be the free state when the parameter is less than or equal to a predetermined second value.

5. The map generating method of claim 1, wherein at least one of an occupancy state of each grid included in the first occupancy grid map, an occupancy state of each grid included in the second occupancy grid map, and an inflated occupancy state of each grid is stored as a data structure in an array form in a database.

6. The map generating method of claim 1, wherein the identifying of the inflated occupancy state comprises identifying, based on a length of the vehicle, an inflation range having the first grid as a center.

7. The map generating method of claim 1, wherein the updating of the occupancy state of the grid comprises performing ray casting based on depth information acquired from a time-of-flight (ToF) sensor and pose information acquired from an inertial sensor.

8. An electronic apparatus comprising:

a memory in which at least one program is stored; and a processor configured to, by executing the at least one program:

based on location information on a vehicle on a first occupancy grid map, identify a second occupancy grid map having a first location as an origin and identify an occupancy state of a grid included in the second occupancy grid map;

update the occupancy state of the grid included in the second occupancy grid map based on information acquired from a sensor;

identify an inflation range corresponding to a first grid among grids included in the second occupancy grid map based on appearance information on the vehicle; and identify an inflated occupancy state of a second grid included in the inflation range based on an occupancy state of the first grid, wherein the processor identifies the occupancy state of the grid included in the second occupancy grid map as one of an occupied state, a free state, and an unknown state, updates the occupancy state of the grid included in the second occupancy grid map to be one of the occupied state and the free state, and identifies the inflated occupancy state of the second grid as one of the occupied state, the free state, and the unknown state based on a result of an update on the occupancy state of the first grid.

9. A non-transitory computer-readable recording medium comprising a computer program for performing a map generating method of an electronic apparatus, wherein the map generating method comprises:

based on location information on a vehicle on a first occupancy grid map, identifying a second occupancy grid map having a first location as an origin and identifying an occupancy state of a grid included in the second occupancy grid map;

updating the occupancy state of the grid included in the second occupancy grid map based on information acquired from a sensor;

identifying an inflation range corresponding to a first grid among grids included in the second occupancy grid map based on appearance information on the vehicle; and identifying an inflated occupancy state of a second grid included in the inflation range based on an occupancy state of the first grid, wherein the identifying the second occupancy grid map and identifying of the occupancy state of the grid comprises identifying the occupancy state of the grid included in the second occupancy grid map as one of an occupied state, a free state, and an unknown state, the updating of the occupancy state of the grid comprises updating the occupancy state of the grid included in the second occupancy grid map to be one of the occupied state and the free state, and the identifying of the inflated occupancy state comprises identifying the inflated occupancy state of the second grid as one of the occupied state, the free state, and the unknown state based on a result of an update on the occupancy state of the first grid.

* * * * *